(12) United States Patent
Buholzer (10) Patent No.: US 9,168,622 B2
(45) Date of Patent: Oct. 27, 2015

(54) FLOATING CHUCK ASSEMBLY FOR A ROTARY CUTTING MACHINE

(71) Applicant: Anton Buholzer, Reno, NV (US)

(72) Inventor: Anton Buholzer, Reno, NV (US)

(73) Assignee: Lincoln Global, Inc., City of Industry, CA (US)

( * ) Notice: Subject to any disclaimer, the term of this patent is extended or adjusted under 35 U.S.C. 154(b) by 212 days.

(21) Appl. No.: 13/937,526

(22) Filed: Jul. 9, 2013

(65) Prior Publication Data

US 2014/0353932 A1 Dec. 4, 2014

Related U.S. Application Data

(60) Provisional application No. 61/828,790, filed on May 30, 2013.

(51) Int. Cl.
| | |
|---|---|
| *B23Q 1/52* | (2006.01) |
| *B23Q 5/20* | (2006.01) |
| *B23K 31/10* | (2006.01) |
| *B23Q 7/04* | (2006.01) |
| *B23Q 1/76* | (2006.01) |

(52) U.S. Cl.
CPC . *B23Q 5/20* (2013.01); *B23K 31/10* (2013.01); *B23Q 1/527* (2013.01); *B23B 2231/00* (2013.01); *B23Q 1/76* (2013.01); *Y10T 279/34* (2015.01)

(58) Field of Classification Search
CPC .. B23B 31/02; B23B 31/103; B23B 2231/10; B23B 2260/00; B23Q 1/527; B23Q 1/706; B23Q 5/20; B23K 11/00
See application file for complete search history.

(56) References Cited

U.S. PATENT DOCUMENTS

| | | | | | |
|---|---|---|---|---|---|
| 2,421,667 | A | * | 6/1947 | Miles et al. | 72/123 |
| 2,476,781 | A | * | 7/1949 | Tomlinson | 279/4.08 |
| 2,651,282 | A | * | 9/1953 | Schweitzer | 118/704 |
| 2,803,064 | A | * | 8/1957 | Eisele | 33/537 |
| 5,157,998 | A | * | 10/1992 | Herrbach | 82/152 |
| 6,575,676 | B2 | * | 6/2003 | Wang et al. | 409/201 |
| 2003/0182782 | A1 | * | 10/2003 | Hessbruggen et al. | 29/27 C |

* cited by examiner

*Primary Examiner* — Will Fridie, Jr.
(74) *Attorney, Agent, or Firm* — Hahn, Loeser & Parks LLP (57) ABSTRACT

A floating chuck assembly used in connection with a workpiece support carrying a workpiece, the floating chuck assembly comprising a chuck assembly; a linkage assembly adapted to support the chuck assembly, the linkage assembly including a mounting link attachable to the chuck assembly, a first link having a first end pivotally attached to a support about a first support axis and having a second end pivotally attached to the mounting link about a first mounting axis, a second link having a first end pivotally attached to the support about a second support axis and a second end pivotally attached to the mounting link about a second mounting axis; and, an extendable support having a first portion attached to the support and a second portion attached to one of the mounting link, first link, and second link, wherein the first portion moves relative to the second portion.

18 Claims, 5 Drawing Sheets

FLOATING CHUCK ASSEMBLY FOR A ROTARY CUTTING MACHINE

This U.S. patent application claims priority to U.S. provisional patent application Ser. No. 61/828,790 filed on May 30, 2013, which is incorporated herein by reference in its entirety.

TECHNICAL FIELD

The present invention generally relates to a chuck assembly for a rotary cutting machine. More particularly, the present invention relates to a floating support assembly for the chuck that allows the chuck to move vertically to accommodate dimensional variation in the workpiece.

SUMMARY OF THE INVENTION

The present invention generally provides a floating chuck assembly used in connection with a workpiece support that carries a workpiece, the floating chuck assembly including a chuck assembly; a linkage assembly adapted to support the chuck assembly, the linkage assembly including a mounting link attachable to the chuck assembly, a first link having a first end pivotally attached to the support about a first support axis and having a second end pivotally attached to the mounting link about a first mounting axis, a second link having a first end pivotally attached to the support about a second support axis and a second end pivotally attached to the mounting link about a second mounting axis; and an extendable support having a first portion attached to the support and a second portion attached to one of the mounting link, first link, and second link, wherein the first portion moves relative to the second portion.

In accordance with an aspect of the invention, the extendable support is a gas cylinder. In accordance with another aspect of the invention, the first support axis and second support axis extend parallel to each other and lie in a common plane. According to another aspect of the invention, the first mounting axis and second mounting axis extend parallel to each other and lie in a common plane. In accordance with still another aspect of the invention, the extendable support attaches to the second link. According to yet another aspect of the invention, the second link is located below the first link.

In accordance with another embodiment of the invention the floating chuck assembly includes a mounting link configured to attach to a chuck assembly; a pair or first links and a second links each of the links having a first end and a second end, wherein the first pair of links are pivotable about a first support axis at the first end of the first links and the first ends of the second links are pivotable about a second support axis, where the second ends of the first links are pivotably attached to the mounting link and pivot about a first mounting axis and the second ends of the second links are pivotably attached to the mounting link and pivotable about a second mounting axis; wherein the first links are laterally spaced from each other and the second links are laterally spaced from each other; and an extendable support attached to one of the links. In accordance with another aspect of the invention, the extendable support extends downward from one of the links and is pivotable about a third support axis, where the first second and third support axes lie in a common plane.

In accordance with another aspect of the invention, the floating chuck assembly includes a mounting plate having a first support bracket to which the first support links are pivotably attached; a second support bracket to which the second links are pivotably attached; and a third support bracket to which a first end of the extendable support is pivotably attached. In accordance with another aspect of the invention, a second end of the extendable support is pivotably attached to the second pair of links. In accordance with another aspect of the invention, the second end of the extendable support is pivotally attached to the second pair of links at a point along the links between the support axis and the mounting axis. In accordance with still another aspect of the invention, the second end of the extendable support is pivotally attached to the second pair of links by a pin extending through the second pair of links. In accordance with another aspect of the invention, the extendable support is a telescoping support. In accordance with another aspect, the telescoping support is a gas cylinder.

DETAILED DESCRIPTION

The present invention relates to a chuck assembly used in a rotary cutting machine. The chuck assembly holds a workpiece and rotates the workpiece. A cutting operation may be performed by rotating the workpiece relative to a stationary cutter. In some instances, the workpiece may also be moved axially by the chuck assembly during cutting. Alternatively, a moving cutter may be used. The workpiece may be a tubular member having one or more outer walls that define a hollow center portion. The tubular member may have any shape or cross-section including the circular cross-section pipe depicted in the accompanying drawings. The workpiece may also be a solid member.

Reference to a link or linkage herein is not limiting to the particular geometries shown in the drawings. It is understood that links may be constructed of various shaped members including simple linear members, curved members, irregular shaped members or combinations thereof. In addition, the thickness of the members shown is merely an example. It is understood that the thickness of the members may vary depending on the loads involved, orientation of the members, desired clearances for surrounding components, and other design factors in accordance with the invention. Similarly, reference to a pivot or pivotal attachment is not limited to any particular geometry and may include any member or assembly that provides relative rotation between components including but not limited to pins, fasteners, bearings, journals, and the like.

Figure 1:
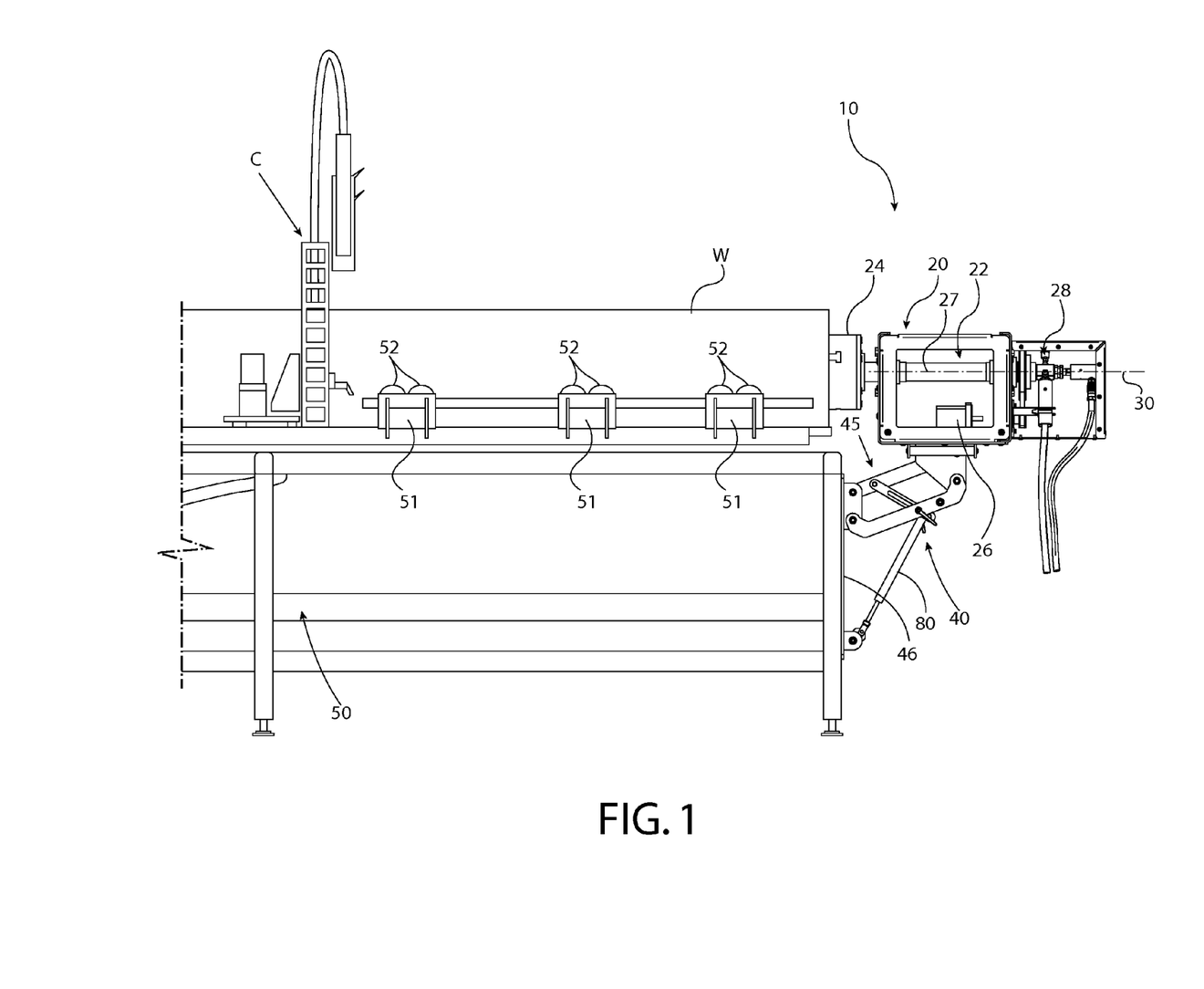
FIG. 1 is a side elevational view of a floating chuck assembly according to the invention used in connection with a pipe cutting assembly.

With reference to FIG. 1, a floating chuck assembly according to the invention is generally indicated by the number 10. Floating chuck assembly 10 includes a chuck assembly 20 that may include a drive assembly 22 and a rotating chuck 24. The chuck assembly 20 may be any chuck assembly used in connection with the cutting operation and may vary depending on the type of workpiece W being cut and the type of cutter C being used. In the example shown, floating chuck assembly 10 is used in connection with a tubular workpiece W having a hollow center, and in particular a pipe of circular cross-section. This example is not limiting as explained above. The workpiece W is shown supported on a workpiece support frame 50 that includes a cutter C supported above the top surface of support frame 50, and described in more detail below.

Chuck assembly 20, as shown, may include a drive assembly 22 that includes a motor 26 that rotates the chuck about the chuck axis 30. Chuck assembly 20 may include a housing that encases the drive assembly 22. The components of the drive assembly 22 may be mounted to the housing, as shown, or, as needed, additional framework or mounting brackets may be provided to support these components. In the example shown, motor 26 and its drive train are mounted in one compartment of the housing and operatively attached to the shaft 27 of chuck 24 to selectively rotate chuck 24.

A second compartment 28 may be provided rearward of the motor compartment to house auxiliary components used to aid in the cutting process. For example, when using plasma cutting equipment, second compartment 28 may house grounding components to ground the plasma cutting unit and a coupling used to provide forced air through the chuck to vent and control smoke/fume emission during the cutting process. In the example shown, the second compartment 28 houses the gearing and reduction components, such as, timing belts, pullies, and the like, used to translate motion from motor 26 to the drive shaft 27 of chuck assembly 20. The front wall of the housing and wall separating the first compartment from the second compartment support the ends of shaft 27 and permit rotation and axial movement of shaft 27, as by a suitable bearing or sleeve in which the shaft is mounted at these walls. Openings may be provided in the housing to permit access to components and to route wires and fluid lines connected to power and fluid supplies that are located remotely relative to the chuck assembly 20.

To support chuck assembly 20 in a manner such that the chuck assembly 20 may move vertically and accommodate variations in the dimensions of the workpiece W, a floating support assembly, generally indicated by the number 40 is provided. In general, floating support assembly 40 includes a support structure that is free to move in at least the vertical direction. In the example shown, floating support assembly 40 includes a linkage assembly, generally indicated by the number 45, that permits vertical movement of the chuck assembly 20 by way of pivoting links that maybe attached to a supporting structure 50. It will be appreciated that the supporting structure may form part of the cutting machine or be a separate stand alone structure.

The support frame 50 shown is just one example of support frames used in similar rotary cutting machines. The example support frame 50 includes an upper support structure or bed, which may be of ladder frame construction and includes one or more cradles 51 that support the workpiece W and allow its rotation. In the example shown, cradles 51 include members that extend inwardly at an angle toward the center of the support frame 50 and include rolling elements 52 that allow for rotation of the workpiece W. Axial movement of the workpiece W may also be permitted to facilitate positioning of the workpiece W and transport to and from the cutting station. To that end, support frame 50, shown, may form part of a larger assembly. Alternatively, other support frames may be used including roller beds and the like. Likewise, any cutter C may be used including stationary cutters or moveable cutters. In the example shown, the cutter C can move parallel to axis 30 and can move vertically. In the example shown, the cutter C is a plasma arc cutter, but other cutters including mechanical cutters, laser cutters, water jet cutters, and flame cutters may be used.

The chuck assembly 20 may be located at one end of support frame 50 and is generally axially spaced from cutter C by a distance corresponding to the length of the workpiece W. To accommodate workpieces W of different lengths, cutter C may be mounted to permit axial movement of the cutter C along the support frame 50 toward or away from the position where the chuck assembly 20 is mounted.

Figure 2:
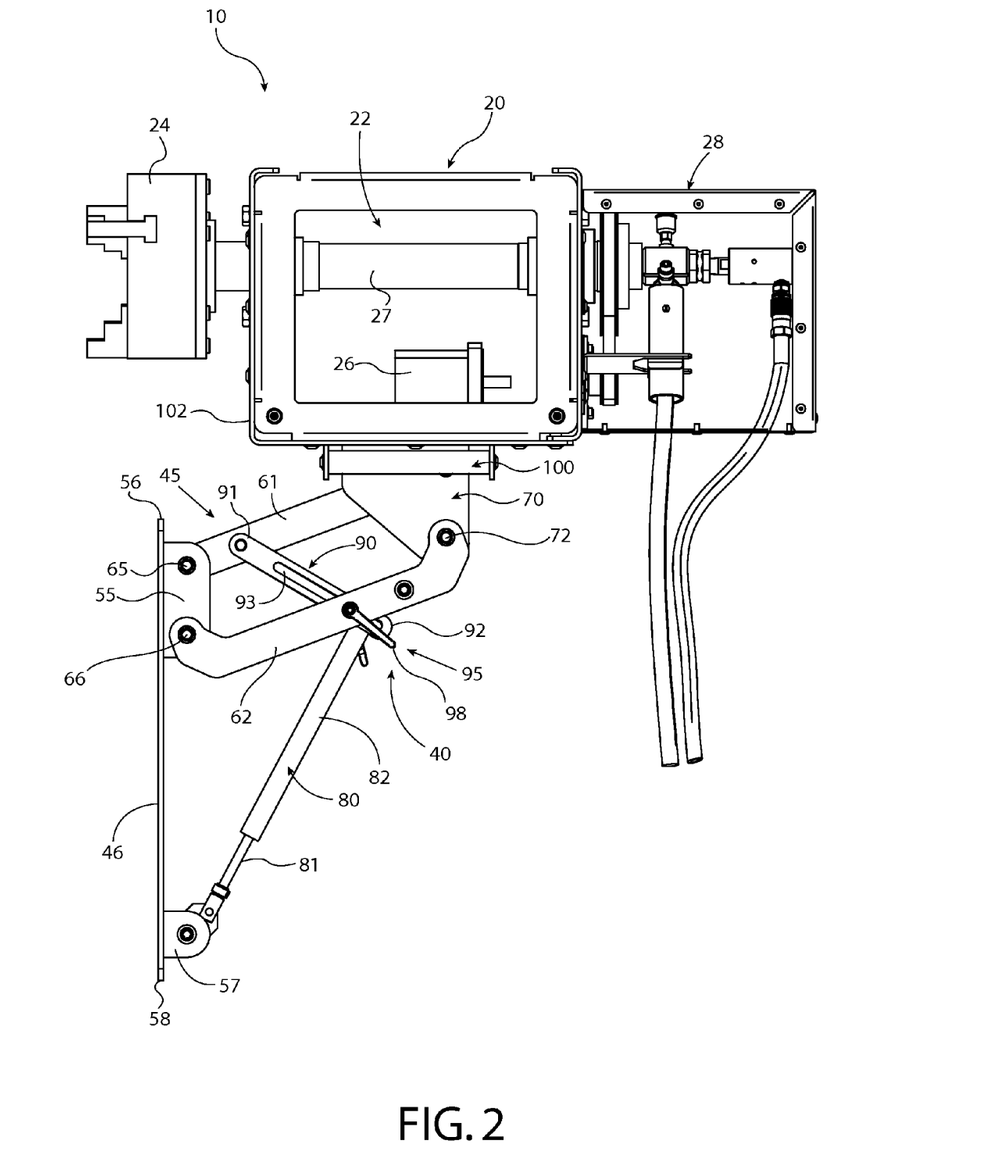
FIG. 2 is a side elevational view of a floating chuck assembly according to the invention.

With reference to FIGS. 1 and 2, to facilitate attachment of floating support assembly 40 to a support structure, a mounting plate 46 or other mounting structure may be provided. Mounting plate 46 may be attached to a supporting structure by any known method including but not limited to welds, clamps, or fasteners. In the example shown, mounting plate 46 includes plural mounting receivers 47 about the periphery 48 of mounting plate 46 through which fasteners extend to attach mounting plate 46 to a support structure such as the workpiece support frame 50.

Figure 3:
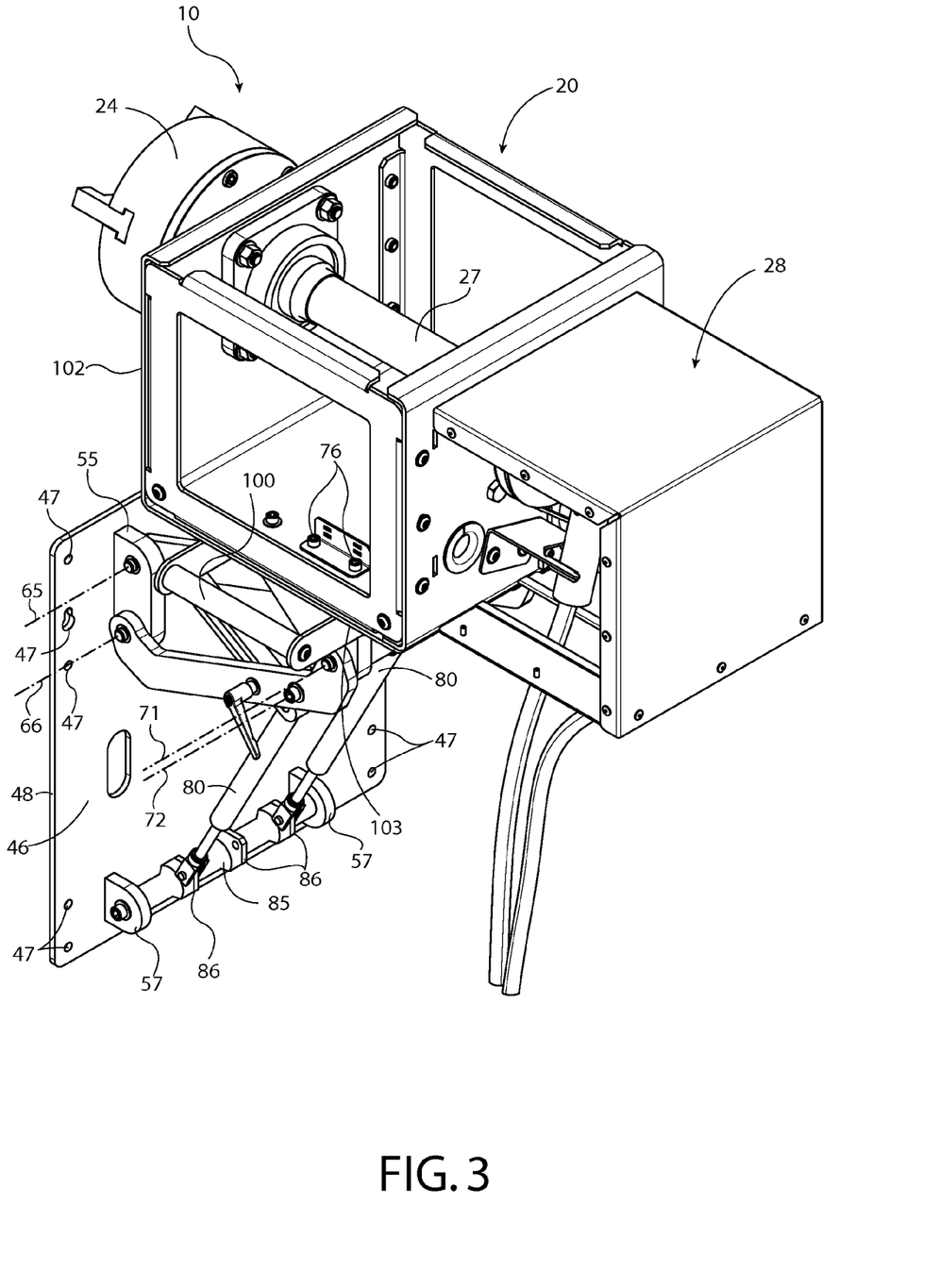
FIG. 3 is a front view thereof.

With reference to FIG. 3, mounting plate 46 may also include plural support receivers to attach support brackets for floating support assembly 40 to the mounting plate 46. It will be appreciated that support brackets may be formed into integrally with mounting plate 46 or attached in other known manners including but not limited to welds, hooks, or clamps. In the examples shown in FIG. 2, a first support bracket 55 extends outward from mounting plate 46 and is located generally near the upper extremity 56 of mounting plate 46. A second support bracket 57 may be provided near the lower extremity 58 of mounting plate 46. It will be appreciated that support brackets 55, 57 may be located further from the extremities 56, 58 of mounting plate 46 and at different distances and locations relative to each other depending on the size of mounting plate 46 and on the structure of the floating support assembly 40.

Figure 4:
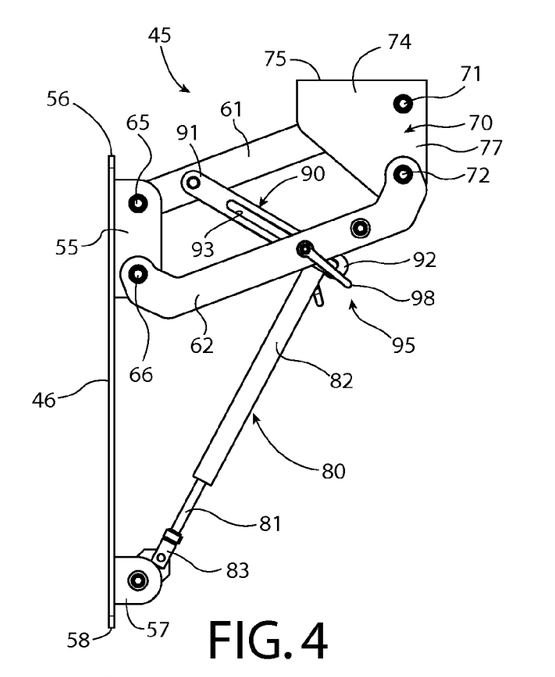
FIG. 4 is a side elevational view of a floating support assembly according to the invention.

As best seen in FIGS. 2 and 4, linkage assembly 45 includes a first link 61 and a second link 62 each having a first end and a second end. The first end 63 (FIG. 5) of first link 61 is pivotally attached to first support bracket 55. The first end 64 of second link 62 also is pivotally attached to first support bracket 55. Thus, first end 63 of first link 61 pivots about a first support axis 65 and first end 64 of second link 62 pivots about a second support axis 66. The second end 67 or first link 61 and the second end 68 of second link 62 are pivotally attached to a mounting link generally indicated by the number 70. To that end, second end 67 of first link 61 is pivotable about a first mounting axis 71 and second end 68 and second link 62 is pivotable about a second mounting axis 72. In the example shown in FIG. 3, first support axis 65 and second support axis 66 are parallel to each other and first mounting axis 71 and second mounting axis 72 are parallel to each other. Further, in the example shown, the supporting axes 65, 66 and mounting axes 71, 72 are all horizontal axes.

Further, in the example shown, first link 61 is located above second link 62 with the first ends 63, 64 of links 61, 62 being equally spaced relative to the second ends 67, 68 of the links 61, 62 such that the axis defined through the pivot points of end 63, 67 of first link 61 lie parallel to the axis defined by the pivot points at ends 64, 68 of link 62. The ends of second link 62 may extend downward relative to pivot points 64,68 and to create additional clearance between the first and second links 61,62.

Mounting link 70 is adapted to attach to chuck assembly 20. In the example shown, mounting link 70 includes a horizontally extending top portion 74 that provides a top surface 75 to which the chuck assembly 20 is attached. As best shown in FIG. 3, one or more fasteners 76 may extend through housing 102 to attach chuck assembly 20 mounting link 70. In the example shown, the base 103 of housing 102 is a generally flat member allowing it to be clamped directly to top surface 75 of mounting link 72 attach the chuck assembly 20 to mounting link 70.

In addition, to allow attachment of first and second links 61,62, mounting link 70 includes a mounting portion 77 that extends downward from top surface 75 an extent sufficient to accommodate both pivot points 67,68. In the example shown, mounting portion 77 extends downward from an outer extremity of mounting link 70 forming an L-shaped form. It will be appreciated that the downwardly depending mounting portion 77 may be formed at other locations intermediate of the ends of mounting link 70 to form a t-shape. The top portion 74 and mounting portion 77 may be formed within a mounting link 70 of any shape capable of attaching to chuck assembly 20 and containing the needed pivot points. Consequently, the somewhat triangular shape shown is an example and is not limiting.

As best seen in FIG. 4, although the forgoing linkage assembly 45 was described with reference to a single first link, second link, and mounting link, as shown, plural spaced apart links may be used. In the example shown, a second set of links is provided to form link pairs including a pair of first links, a pair of second links, and a pair of mounting links laterally spaced from each other. In the example shown, the links are the same and the same reference numerals have been used to indicate the same parts. It would be appreciated that a single mounting link may be used in connection with the pairs of first and second links, and, therefore the depicted configuration is not limiting.

Overall, with chuck assembly 20 attached to mounting link 70, which, in turn, is pivotally connected to mounting plate 46 by first link 61 and second link 62, vertical movement of chuck assembly 20 is permitted while maintaining chuck assembly 20 level with respect to workpiece W. Dimensional variation of the workpiece W, which often is accommodated by varying the height of the cutter as the workpiece W is rotated, may instead be accommodated by varying the height of the chuck assembly 20 on floating support 40. In particular, the reaction force created as the workpiece W is rotated is transmitted to linkage assembly 45 causing it to pivot. As described more completely below, a support 80 may be provided to support the linkage assembly 45 and permit its vertical movement.

To allow vertical movement of linkage assembly 45, support 80 may be an extendable support including but not limited to a unitary flexible member, such as, a bungee cord, elastic band, leaf spring; or a multiple piece member, such as the telescoping member shown. These examples are not limiting. With reference to FIG. 4, extendable support 80 includes a first portion 81 and a second portion 82 that are moveable relative to each other. Extendable support 80 may be attached to any of the links and is adapted to support linkage assembly 45 and allow vertical movement thereof. It will be appreciated that the extendable support 80 may be in a variety of configurations to support chuck assembly 20 including configurations that place the support 80 in tension or compression. In the example shown, extendable support 80 extends downward and inward from linkage assembly 45 and is pivotably attached at a first end 83 to second support bracket 57 on mounting plate 46 and pivotably attached to second link 62 at a second end 84. As shown, a pair of extendable supports 80 may be used. Pivotal attachment of the first end 83 of extendable support 80 may be made by a pin extending through a second support bracket 57. Alternatively, as shown, when using pairs of links, a first support arm 85 may be supported between the second support brackets 57 and provide an attachment point for the extendable support 80 inward of the innermost link, which in the example shown, is second link 62.

Figure 5:
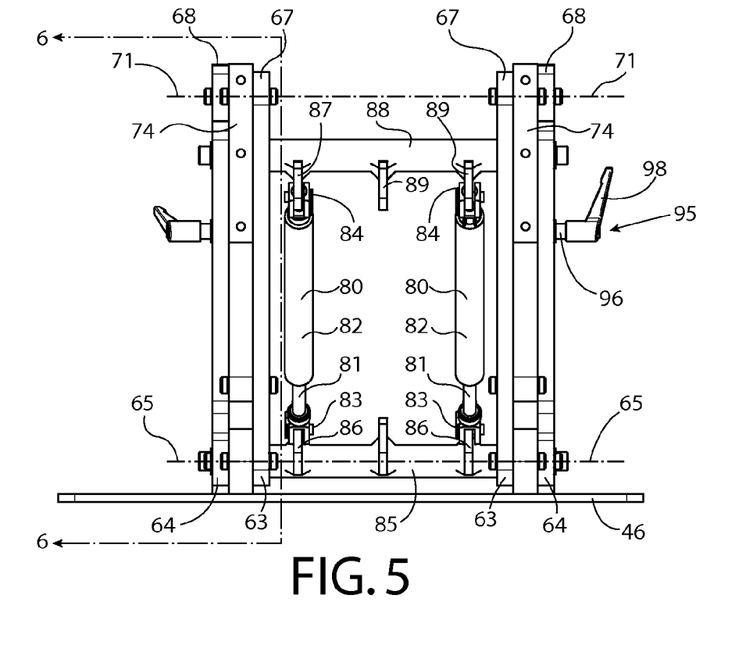
FIG. 5 is a top view thereof.

To that end, mounting tabs 86 may be provided on arm 85 and define a receiver through which a pin or other form of pivotal attachment is received. In the example shown, three tabs 86 are provided to provide some flexibility in the use of extendable support 80 and its mounting location. For example, the central tab 86 may be used for a single extendable support 80. Or, as shown, two extendable supports 80 may be attached to the tabs 86 on either side of the central tab. Again, pivotal attachment of the extendable support 80 may be made in any known manner. In the example shown, extendable support 80 includes a clevis at each end that may be pinned to a mounting tab as described herein. A second arm 88 may be used to pivotally attach the second end 84 of extendable support 80. In the example shown, second arm 88 extends between second links 62 and includes mounting tabs 89 that extend inward to provide an attachment point for the second end 84 of extendable support 80. Second tabs 89 are located directly opposite first tabs 86 and have a similar structure defining a receiver through which a pin or other form of pivotal attachment is received. As best shown in FIG. 5, arms 86, 88 may be attached to support bracket 57 and links 62 by a fastener, such as a pin or bolt, that is inserted through support 57 and link 62 into a hollow central portion of the arms 85, 88. While the arms 85, 88, shown, generally have a tubular construction for receiving the fastener, other configurations may be used and the arm fastened to the links or a supporting bracket.

Extendable support 80 may be any member that provides support and allows vertical movement of linkage assembly 45 including but not limited to a hydraulic cylinder, gas cylinder or the like. It will be appreciated that a hydraulic cylinder or gas cylinder may provide additional benefit in that these extendable supports may provide a damping effect. The amount of damping force created may be varied by selecting a cylinder with suitable valving, fluid, or other features common to such dampers used to create a desired damping force. Alternatively, the number of cylinders may be increased or decreased to accommodate the load of chuck assembly 20 and forces created during operation and/or provide the desired damping effect. In the example shown, additional tabs 86, 89 may be provided to accommodate additional cylinders and facilitate their attachment even after the floating chuck assembly 10 is assembled. In the example shown, three tabs are provided on each arm, but only two cylinders are used in the initial set up of floating chuck 10. If needed, a third cylinder may be attached to the unused tabs 86,89 to provide additional support or damping without having to disassemble floating chuck assembly 10.

Figure 6:
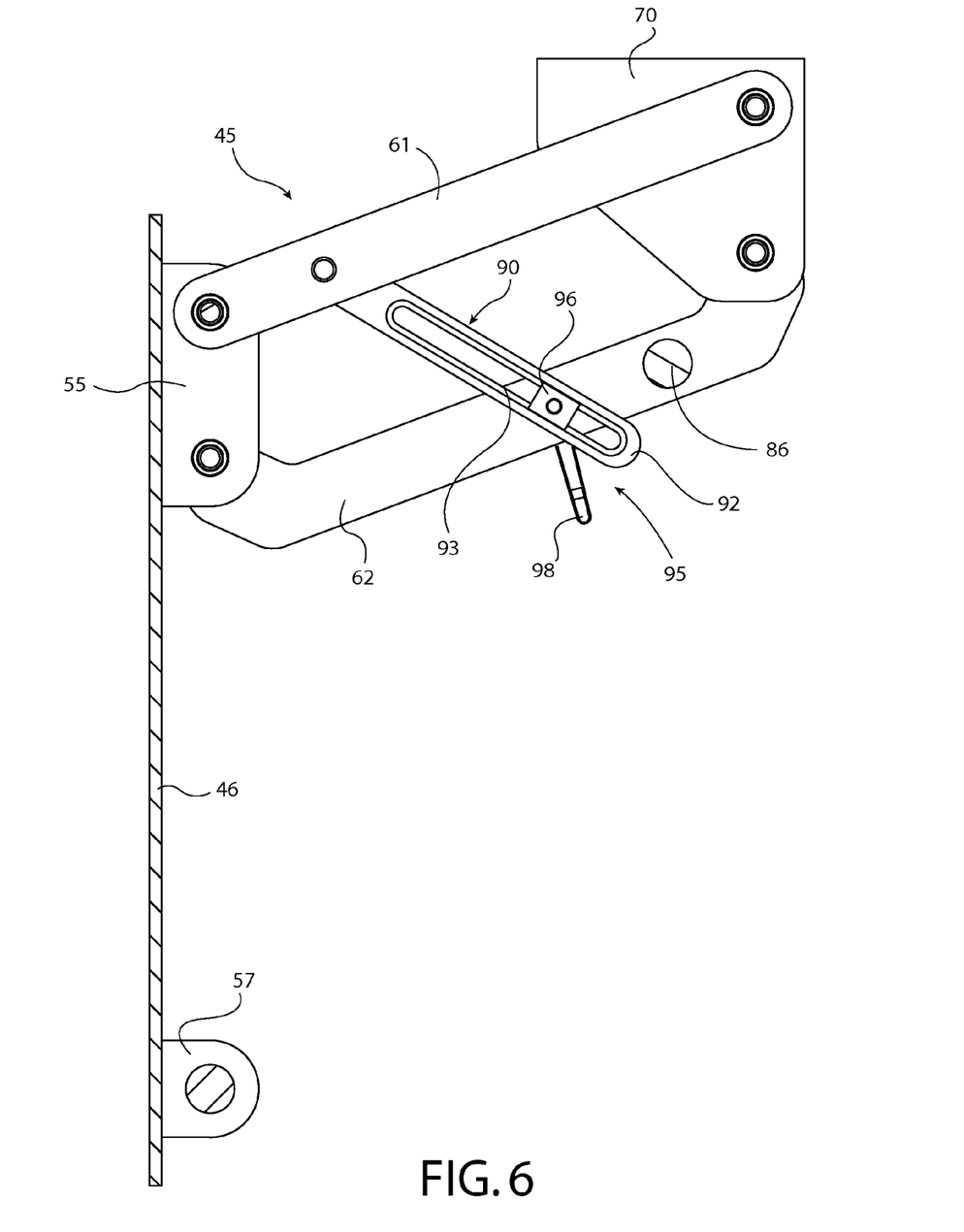
FIG. 6 is a side elevational view as might be seen along line 6-6 in FIG. 5.

In accordance with another aspect of the invention, linkage assembly 45 may include a cross link generally indicated by the number 90. Cross link 90 may be used to selectively hold the links 61,62 in a desired position as discussed below. Cross link 90 extends between first link 61 and second link 62. A first end 91 of cross link 90 is pivotally attached to first arm 61. Cross link 90 extends downward from first end 91 terminating in a second end 92. As best shown in FIG. 6, a slot 93 may be provided in cross link 90 extending from second end 92 toward first end 91. Cross link 90 is pivotally attached to first link 61. Second link 62 may attach at slot 93. To selectively adjust the relative length of cross link 90 relative to links 61, 62, the attachment point within slot 93 may be changed. In the example shown, an adjustment assembly, generally indicated by the number 95 may be provided to selectively connect second link 62 to cross link 90 in various positions within slot 93. In the example shown, adjustment assembly 95 includes a locking member 96 extending through second link 62 and through slot 93. Locking member 96 may be slideable within slot 93 and selectively locked into position by rotating it between a sliding configuration and a fixed configuration. For example, rotating of locking member 96 may draw locking member 96 inward into slot 93 to clamp cross link 90 and second link 62 together. This clamping also holds locking member 96 from sliding within slot 93. A handle 98 may be provided on the outwardly facing end of the locking member 96 to facilitate adjustment of the relative length of cross link 90 and locking the links in a desired position. Optionally, slot 93 may have rabbeted edges and locking member 96 may have a t-shaped cross section with a nose that extends into the narrow portion of slot 93 and shoulders extending laterally outward from the nose that ride on the rabbeted edges of slot 93.

Adjustment assembly 95 may be loosened to allow pin 96 to slide within slot 93 of cross link 92 during operation. In general, the floating support assembly 40 includes a support 80 that is able to maintain the chuck assembly 20 in a neutral position even with the workpiece W mounted on chuck 24. It is anticipated that an operator may wish to lock the chuck assembly in position before attaching the workpiece W to chuck 24. To that end, the operator may fix the position of the linkage by tightening adjustment assembly 95 and locking the cross link 90 to second link 62. The operator is then free to adjust the initial position of the linkage assembly 45 to support chuck assembly 20 in the proper position relative to the workpiece W for operation. Once the height of the chuck assembly is initially set, adjustment assembly may be released using lever 98 to allow the linkage assembly 40 to float freely in response to dimensional changes in the workpiece W.

To further facilitate set up, a handle, generally indicated by the number 100 may be provided on chuck assembly 20. The handle may be of any shape or configuration that may be gripped by the operator. In addition, the handle 100 may be located anywhere on the chuck assembly. Optionally, handle 100 may be attached to one or more of the links in linkage assembly 45. For example, handle 100 may extend from a mounting link.

In the example shown, handle 100 extends laterally outward from a housing 102 that encloses drive assembly 22. Handle 100 may extend a distance sufficient to allow handle 100 to be located just beneath the lateral outward edge of chuck assembly 20 or slightly beyond the lateral outward edge of chuck assembly 20 to facilitate its location and handling by the operator. Optionally, handle 100 may be made to extend and retract, as needed. It will be appreciated that handle 100 may be located anywhere on housing 102 and extend from any surface including the top, bottom, or sides. For example, as shown, handle 100 may be located on the same side as the lever 98 used to set the position of adjustment assembly 95 to allow the user to simultaneously support a chuck assembly with a handle and tighten the adjustment assembly 95 with their free hand.

Various embodiments herein need not include the described and/or illustrated geometries. For example, the links depicted in the accompanying figures merely suggest some possible embodiments that can be cognized under the disclosures herein. For example, various shapes can be employed. Straight-line geometries can be employed in place of rounded portions and vice versa. Thus, while one or more particular embodiments have been described in detail, these details are not to be interpreted as exhaustive or exclusive.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

Specific embodiments of an innovation are disclosed herein. One of ordinary skill in the art will readily recognize that the innovation may have other applications in other environments. In fact, many embodiments and implementations are possible. The following claims are in no way intended to limit the scope of the subject innovation to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the subject innovation has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (e.g., enclosures, sides, components, assemblies, etc.), the terms (including a reference to a "means") used to describe such elements are intended to correspond, unless otherwise indicated, to any element which performs the specified function of the described element (e.g., that is functionally equivalent), even though not structurally equivalent to the disclosed structure which performs the function in the herein illustrated exemplary embodiment or embodiments of the innovation. In addition, while a particular feature of the innovation may have been described above with respect to only one or more of several illustrated embodiments, such feature may be combined with one or more other features of the other embodiments, as may be desired and advantageous for any given or particular application. Although certain embodiments have been shown and described, it is understood that equivalents and modifications falling within the scope of the appended claims will occur to others who are skilled in the art upon the reading and understanding of this specification.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

The invention claimed is:

1. A floating chuck assembly used in connection with a workpiece support carrying a workpiece, the floating chuck assembly comprising:
    a chuck assembly;

a linkage assembly adapted to support the chuck assembly, the linkage assembly including a mounting link attachable to the chuck assembly, a first link having a first end pivotally attached to a support about a first support axis and having a second end pivotally attached to the mounting link about a first mounting axis, a second link having a first end pivotally attached to the support about a second support axis and a second end pivotally attached to the mounting link about a second mounting axis; and, an extendable support having a first portion attached to the support and a second portion attached to one of the mounting link, first link, and second link, wherein the first portion moves relative to the second portion, wherein the extendable support attaches to the second link, wherein the second link is located below the first link.

2. A floating chuck assembly used in connection with a workpiece support carrying a workpiece, the floating chuck assembly comprising:

a chuck assembly;

a linkage assembly adapted to support the chuck assembly, the linkage assembly including a mounting link attachable to the chuck assembly, a first link having a first end pivotally attached to a support about a first support axis and having a second end pivotally attached to the mounting link about a first mounting axis, a second link having a first end pivotally attached to the support about a second support axis and a second end pivotally attached to the mounting link about a second mounting axis; and, an extendable support having a first portion attached to the support and a second portion attached to one of the mounting link, first link, and second link, wherein the first portion moves relative to the second portion; and a cross link extending between the first link and the second link and pivotally attached to each of the first and second links, wherein the cross link defines a slot extending along the cross link, and wherein an adjustment assembly is carried on one of the first and second links and includes a locking member protruding outward from the link and slidably received within the slot, wherein the locking member is selectively fixed in the slot to adjust the relative length of the cross link.

3. The floating chuck assembly of claim 2, wherein the locking member is rotatable to draw locking member inward relative to the slot to fix the locking member therein.

4. A floating chuck assembly used in connection with a workpiece support carrying a workpiece, the floating chuck assembly comprising:

a chuck assembly;

a linkage assembly adapted to support the chuck assembly, the linkage assembly including a mounting link attachable to the chuck assembly, a first link having a first end pivotally attached to a support about a first support axis and having a second end pivotally attached to the mounting link about a first mounting axis, a second link having a first end pivotally attached to the support about a second support axis and a second end pivotally attached to the mounting link about a second mounting axis; and, an extendable support having a first portion attached to the support and a second portion attached to one of the mounting link, first link, and second link, wherein the first portion moves relative to the second portion, wherein the first end of the second link extends downward and outward relative to the second support axis, and the second end of the second link extends downward and inward from the second mounting axis.

5. A floating chuck assembly used in connection with a workpiece support carrying a workpiece, the floating chuck assembly comprising:

a chuck assembly;

a linkage assembly adapted to support the chuck assembly, the linkage assembly including a mounting link attachable to the chuck assembly, a first link having a first end pivotally attached to a support about a first support axis and having a second end pivotally attached to the mounting link about a first mounting axis, a second link having a first end pivotally attached to the support about a second support axis and a second end pivotally attached to the mounting link about a second mounting axis; and, an extendable support having a first portion attached to the support and a second portion attached to one of the mounting link, first link, and second link, wherein the first portion moves relative to the second portion; and a handle attached to the chuck assembly and extending laterally outward of the chuck assembly.

6. A floating chuck assembly comprising a mounting link configured to attach to a chuck assembly;

a pair of first links and a pair of second links each of the links having a first end and a second end where the first pair of links are pivotable about a first support axis at a first end thereof and the first ends of the second links are pivotable about a second support axis, where the second ends of the first links are pivotably attached to the mounting link and pivot about a first mounting axis and the second ends of the second links are pivotably attached to the mounting link and pivotable about a second mounting axis;

wherein the first links are laterally spaced from each other and the second links are laterally spaced from each other; and, an extendable support is attached to one of the mounting link, first links and second links.

7. The floating chuck assembly of claim 6, wherein the extendable support extends downward from one of the links and is pivotable about a third support axis, where the first, second and third support axes lie in a common plane.

8. The floating chuck assembly of claim 6, further comprising an arm extending between one of the first pair of links and second pair of links, wherein the extendable support is attached to the arm.

9. The floating chuck assembly of claim 6, further comprising a pair of cross links, each cross link having a first end and a second end, where the first end of each cross link attaches to a first link and the second end attaches to the second link of a respective link pair.

10. The floating chuck assembly of claim 9, wherein each cross link defines a slot extending along the cross link, wherein an adjustment assembly is carried on one of the links and includes a locking member protruding outward from the link and slidably received within the slot, wherein the locking member is selectively fixed in the slot to adjust the relative length of the cross link.

11. The floating chuck assembly of claim 10, wherein the locking member is rotatable between a sliding configuration and a fixed configuration and wherein a handle is mounted on the locking member to facilitate rotation between the fixed and the sliding configuration.

12. The floating chuck assembly of claim 6, further comprising a mounting plate having a first support bracket to which the first support links are pivotably attached about the first support axis and the second links are pivotally attached to the first support bracket about the second support axis.

13. The floating chuck assembly of claim 12, wherein the first support links are attached on an inward side of the first support bracket and the second links are mounted on an outward side of the first support bracket.

14. The floating chuck assembly of claim 6, wherein the mounting link includes a first portion defining a top surface to which the chuck assembly is attached and a second portion that extends downwardly from the top surface, wherein the second ends of the first pair of links and second pair of links are attached to the downward extending portion and wherein the mounting axes of the first pair of links and second pair of links are aligned in a common plane.

15. The floating chuck assembly of claim 4, wherein the extendable support is a telescoping member.

16. The floating chuck assembly of claim 15, wherein a telescoping support is a gas cylinder.

17. The floating chuck assembly of claim 4, wherein the first support axis and second support axis extend parallel to each other and lie in a common plane.

18. The floating chuck assembly of claim 4, wherein the first mounting axis and second mounting axis extend parallel to each other and lie in a common plane.

\* \* \* \* \*